(12) United States Patent
Goodman et al.

(10) Patent No.: US 6,757,694 B2
(45) Date of Patent: Jun. 29, 2004

(54) SYSTEM AND METHOD FOR LOGICALLY ASSIGNING UNIQUE NAMES TO DEVICES IN A STORAGE SYSTEM

(75) Inventors: Brian Gerard Goodman, Tucson, AZ (US); Leonard George Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 09/969,925

(22) Filed: Oct. 3, 2001

(65) Prior Publication Data

US 2003/0065684 A1 Apr. 3, 2003

(51) Int. Cl.$^7$ .............................................. G06F 17/30
(52) U.S. Cl. ................................................. 707/104.1
(58) Field of Search .............................. 707/104.1, 100, 707/102, 1; 711/219; 709/200

(56) References Cited

U.S. PATENT DOCUMENTS

| | | | | |
|---|---|---|---|---|
| 5,155,763 A | * | 10/1992 | Bigus et al. | 379/111 |
| 5,179,701 A | * | 1/1993 | Chisholm | 707/104.1 |
| 5,446,680 A | * | 8/1995 | Sekiya et al. | 709/200 |
| 5,586,264 A | * | 12/1996 | Belknap et al. | 725/115 |
| 5,588,119 A | | 12/1996 | Vincent et al. | |
| 5,630,076 A | * | 5/1997 | Saulpaugh et al. | 710/104 |
| 5,778,226 A | * | 7/1998 | Adams et al. | 719/311 |
| 6,057,981 A | | 5/2000 | Fish et al. | |
| 6,195,703 B1 | | 2/2001 | Blumenau et al. | |
| 6,199,112 B1 | | 3/2001 | Wilson | |
| 6,209,023 B1 | | 3/2001 | Dimitroff et al. | |

* cited by examiner

*Primary Examiner*—Safet Metjahic
*Assistant Examiner*—Sana Al-Hashemi
(74) *Attorney, Agent, or Firm*—Scully, Scott, Murphy & Presser; Jean M. Barkley, Esq.

(57) ABSTRACT

A system and method for assigning unique names to data storage products. The system and method is applicable for assigning unique World Wide Names to library storage products having removable or fixed media storage devices, or existing library storage products to be provisioned with Fiber Channel interface connections. When configuring new library storage products the method comprises the steps of: allocating a range of names to the library storage product, a name being assigned in one-to-one correspondence with a device position in the library and, the range including a base name (Base__N) for indicating where device position numbering begins; and, storing the base name in a memory associated with the library; installing a data storage device at a position in the library; and automatically calculating a unique name N based on the stored base name and the data storage device position of the installed device and assigning the calculated name to the installed device. Assignment of names to existing library storage products provisioned requires allocation of unique names according to the serial numbers of each existing automated library storage product.

61 Claims, 4 Drawing Sheets

SYSTEM AND METHOD FOR LOGICALLY ASSIGNING UNIQUE NAMES TO DEVICES IN A STORAGE SYSTEM

BACKGROUND OF THE INVENTION

1. Field of the Invention

The present invention relates generally to network devices in a storage system implementing unique names for enabling communication with the devices. More particularly, the invention relates to a novel system and method for uniquely identifying and assigning names to devices connected in networks.

2. Description of the Prior Art

A common host communication interface for open systems storage products is Fibre Channel-Arbitrated Loop (FC-AL) which can be used to connect large amounts of storage to a server or cluster of servers. A Fibre Channel-Arbitrated Loop (FC-AL) disk and tape drive interface particularly enables implementation of new applications that need high-speed data storage over long distances. These emerging applications include professional movie editing, collaborative engineering efforts, video-on-demand, medical imaging, and high-volume transaction processing. Hard disk and tape drives supporting the FC-AL interface are now available from most of the world's computer system manufacturers.

The Fibre Channel protocol identifies devices using a convention referred to as World Wide Names (WWN). This is similar in concept to network interfaces, such as provided for Ethernet and Token Ring systems which are assigned unique Media Access Control (MAC) addresses. Each Fibre Channel device has a unique World Wide Name such that no two devices in the world should have the same WWN.

Storage automation products, such as the IBM 3584 Ultra Scalable Tape Library, provided by International Business Machines, the assignee of the present invention, may provide one or more Fibre Channel communications interfaces and the data storage drives included in the library may also provide Fibre Channel communications interfaces.

Service of the library becomes a problem when the library component that provides the Fibre Channel connection is replaced, or when one of the Fibre Channel drives in the library are replaced. This is because those Fibre Channel components each have a unique World Wide Name and the replacement parts (or drives) will have a completely different World Wide Name. Host systems typically configure their Fibre Channel devices at power-on and they will require a reboot or re-initialization of host software to recognize any devices that have been replaced.

That is, the problem is currently solved by a reboot or re-initialization of any affected host systems. This is a real problem for customers that expect a minimum of downtime.

Thus, it is a perceived problem that when a Fibre Channel component is replaced in the library there is experienced a customer down-time.

It would thus be highly desirable to provide a system and methodology for eliminating customer down-time whenever a Fibre Channel component is replaced in the library.

It would be additionally desirable to provide a system and method for assigning a unique identifier, e.g., World Wide name, to Fibre Channel components provided in storage automation products. More generally, it would be desirable to provide a system and method for assigning a unique identifier to any interface component of a network or storage sub-system device.

A further problem of these storage automation products is the problem of updating libraries in the field. Initially, the IBM 3584 automated data storage library was only available with a SCSI host attachment.

An exemplary automated data storage library 10 such as the IBM 3584 Ultra Scalable Tape Library, is illustrated in FIG. 1, which depicts one or more data storage drives 12, for reading and/or writing data on removable storage media 14, such as magnetic tape cartridges or optical disk cartridges, and the like. A plurality of the data storage media 14 are stored in banks of storage shelves 16. Preferably, an accessor 18 mounts a picker 20 and moves horizontally on rails 34 and 35 and vertically to move the picker to access data storage media 14 and transport the media amongst the data storage drives 12, the storage shelves 16 and an input/output (I/O) station 23. As shown in FIG. 3, a library controller 24 is provided which may comprise at least one microprocessor 25 a non-volatile memory device 26, such as a disk drive and/or flash memory and I/O circuits or adapters 27 such as serial ports or register I/O. The controller is coupled with and controls the operation of, the assessor 18, and picker 20, and may interface with the data storage devices 12. The controller may be coupled to one or more of the input/output stations 23, which allow the transfer of data storage media 14 into and out of the library. The controller 24 may additionally be coupled to an operator panel 30 and, additionally to a host system 28, typically via an interface 29 such as SCSI or Fibre Channel ports. The controller 24 receives access commands from the host system 28 for the selection and transport of data storage media amongst the data storage drives 12, the storage shelves 16 and the I/O station 23. The host system 28 may be coupled to the drives 12, and information to be recorded on, or to be read from, selected data storage media 14 may be transmitted between the drives and the host system 28. Alternatively, the library controller may be coupled to the data storage drives 12, and transfers the data between the drives and the host system.

More particularly, the library controller 24 stores programs for operating the library in accordance with vital information. That is, typically, every library is at a different level with regard to engineering change levels, physical configuration, and logical configuration, and has different calibration values, e.g., for aligning the accessor. This information is also referred to as Vital Product Data (VPD) and may be stored in the non-volatile storage 26 for access by the computer processor 25. As further shown in FIGS. 1 and 5, a machine readable serial number 47 is provided, shown mounted on the frame of the library, for example, by means of a mounting plate 48 on a bracket 49 fixed to the frame such that the machine readable serial number is at a predetermined location of the frame. The machine readable serial number may comprise a bar code label or other sensible indicator. As shown in FIGS. 1 and 4, a positionable reader 40, such as a bar code reader, is provided for reading the machine readable serial number identifier 47. In the operation of the library, the positionable reader 40 may also be employed for reading bar code labels 45 which identify each of the data storage media 14. The reader is preferably mounted on the accessor 18, either directly or on the picker 20, to be moved to the machine readable serial number identifier 47 or bar code label 45 for reading the respective machine readable identifier. Alternatively, the serial number identifiers may be stored in electronic form, e.g., in non-volatile memory 26 (FIG. 3), or, as an electronic serial number such as may be provided in an electronic component or device. In this case, there is no requirement for a positionable reader 40.

Currently, it is desirable to integrate a Fibre Channel host attachment to customers that already own the 3584 Ultra Scalable Tape Library. Since the library interface World Wide Names belong to the library, they are saved as VPD.

Upgrading an existing customer would normally involve a manual process because the library VPD would have to be updated to include a valid World Wide Name for the specific library being updated. This cannot be done with a common code update because each library would require a unique World Wide Name.

It would thus be highly desirable to provide a system and methodology for allocating a group of World Wide Names and then using a unique serial number to identify and use a subset of the allocation group.

SUMMARY OF THE INVENTION

It is therefore an object of the present invention to provide a system and method for assigning a unique identifier to any interface component of a network or storage sub-system device.

It is another object of the present invention to provide a system and methodology for assigning a unique identifier, e.g., World Wide Name, to Fibre Channel interface components provided in storage automation products.

It is a further object of the present invention to provide a system and methodology for eliminating customer down-time whenever a Fibre Channel component is replaced in a data storage library.

It is yet another object of the present invention to provide a system and method for allocating a group of World Wide Names and then using a system serial number to identify and use a subset of the allocation group when retrofitting Fibre Channel components in existing storage automation products.

Thus, according to the principles of the invention, there is provided a system and method for assigning unique names to automated library storage products. The system and method is applicable for assigning unique World Wide Names to newly manufactured library storage products or existing storage sub-systems to be re-provisioned with Fibre Channel loop interface or other state-of-the-art connectivity. When configuring new library storage products, the method comprises the steps of: allocating a range of names to the library storage product, a name being assigned in one-to-one correspondence with a device position in the library and, the range including a base name (Base_N) for indicating where library device naming begins; and, storing the base name in a memory associated with the library; installing a data storage device at a position in the library; and automatically calculating a unique name N based on the stored base name and the data storage device position of the installed device and assigning the calculated name to the installed device.

Assignment of names to library storage products being provisioned may require allocation of unique names according to the serial numbers of each automated library storage product. Alternatively, unique firmware update images, service tools, input at an operator panel, or other library interfaces may be used to set the base name.

Advantageously, the system and method of the present invention may be employed for assigning MAC addresses in the context of network interface connections, or, for that matter, assigning names to any type of device present in a storage sub-system, whether comprising removable or non-removable data storage media.

BRIEF DESCRIPTION OF THE DRAWINGS

Further features, aspects and advantages of the apparatus and methods of the present invention will become better understood with regard to the following description, appended claims, and the accompanying drawings where:

DETAILED DESCRIPTION OF PREFERRED EMBODIMENTS

Figure 1:
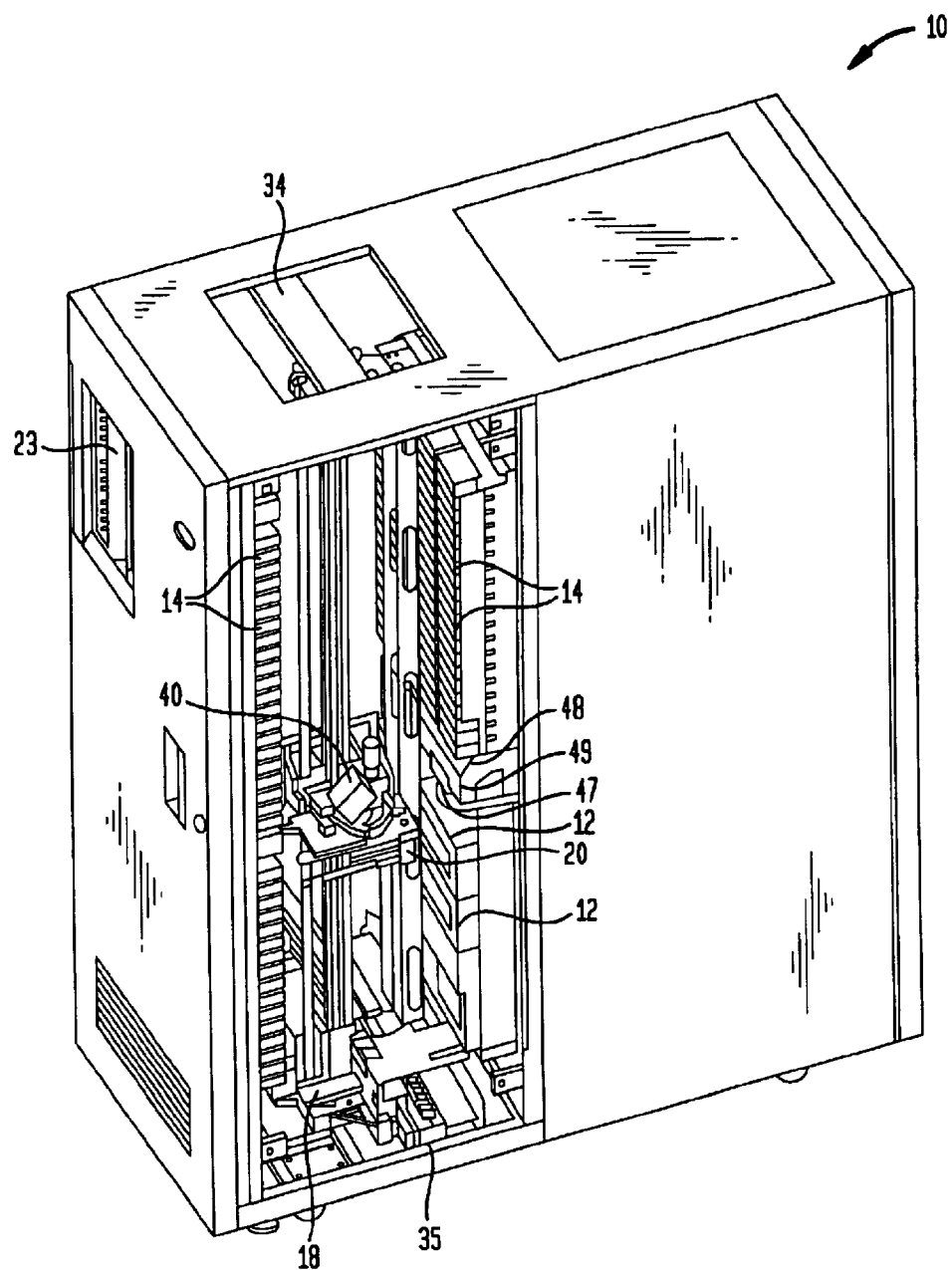
FIGS. 1 and 2 are perspective views of an embodiment of an automated data storage library.
Figure 2:
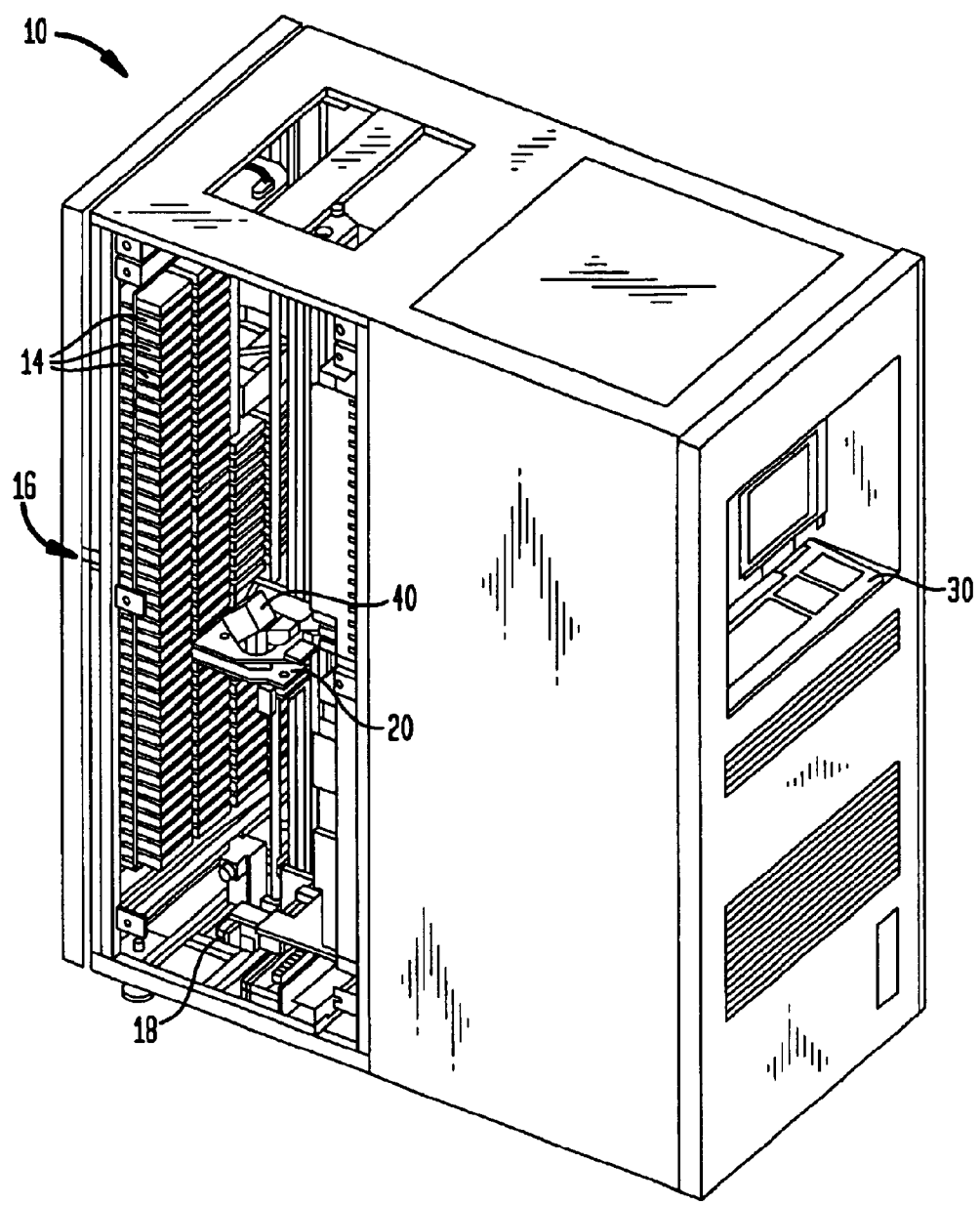
Figure 3:
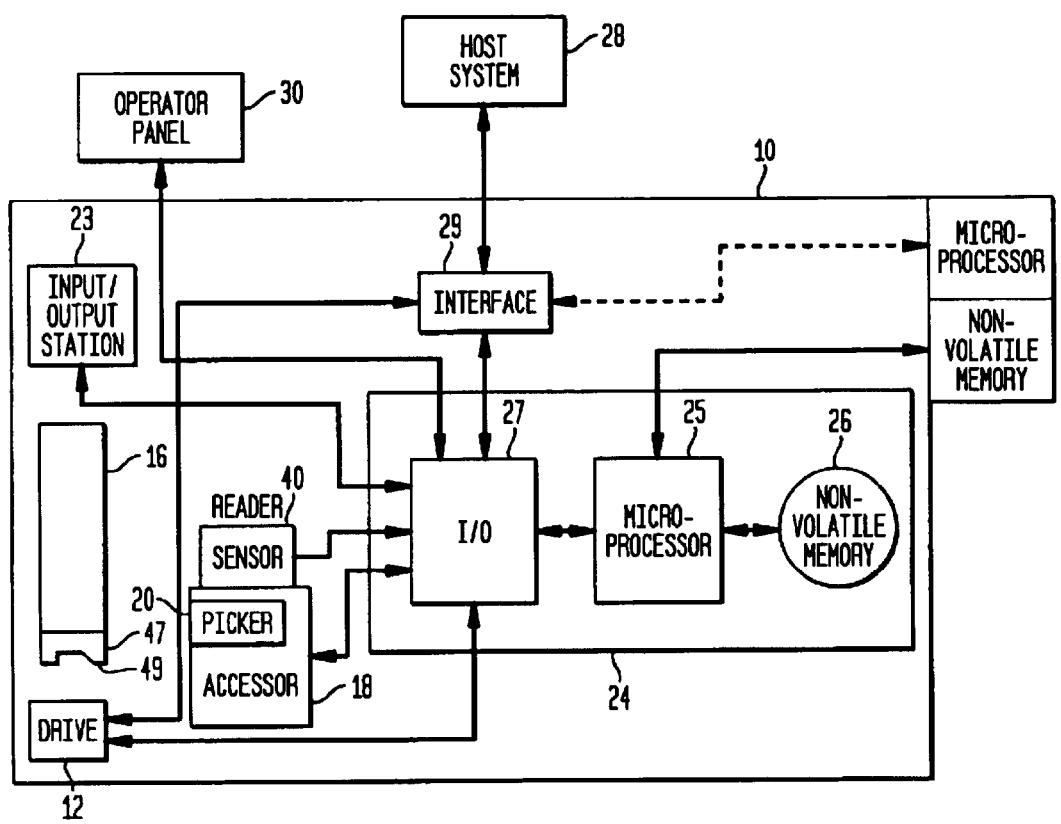
FIG. 3 is a general block diagram depicting the underlying system architecture of the automated data storage library of FIGS. 1 and 2.
Figure 5:
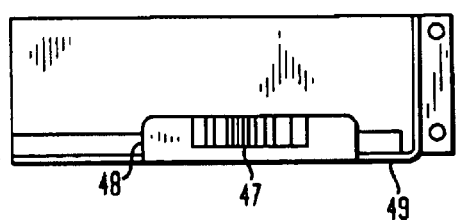
FIG. 5 is an illustration of the machine readable serial number identifier of FIG. 4.
Figure 4:
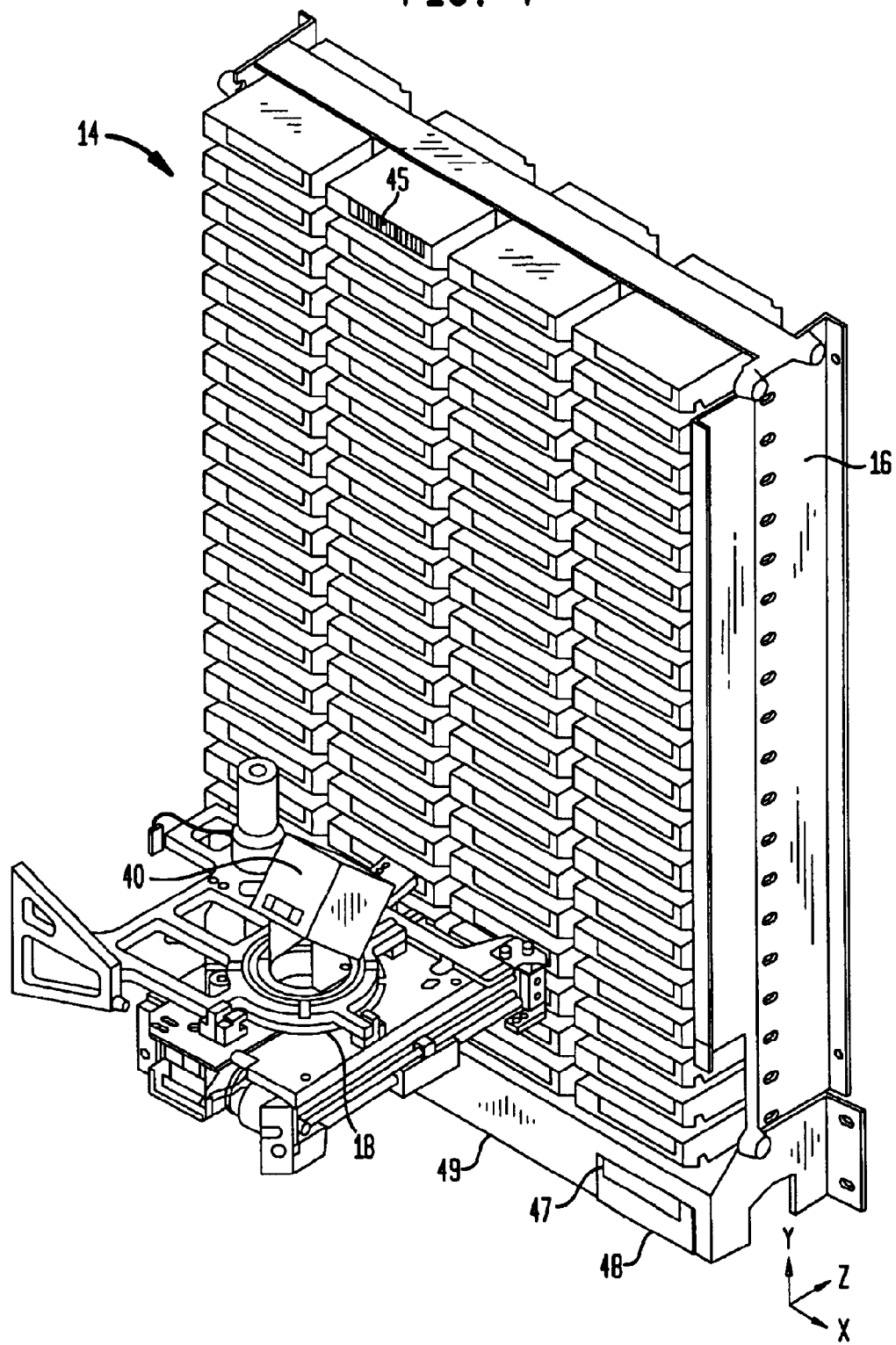
FIG. 4 illustrates a positionable reader in proximity to a machine readable serial number and a bank of storage shelves of the library of FIGS. 1 and 2.

The present invention will eliminate customer down-time whenever a Fibre Channel component is replaced in the library.

In a first embodiment, the automated storage library will own the World Wide Names for every possible Fibre Channel component in the library. Therefore, the WWN, for a particular Fibre Channel component in the library never changes, even when the component is replaced.

Particularly, according to the invention, a range of World Wide Names is assigned to each storage automation product, such that the range includes enough World Wide Names to satisfy a maximum allowed configuration. This range would be identified with a base World Wide Name. For example, the IBM 3584 automated data storage library permits a maximum of 12 drives per frame and 6 frames per library. This is a maximum of 72. Thus, 72 World Wide Names would be assigned to every library for all potential drive slots. The first drive in the first frame would be identified by the base World Wide Name. The last drive in frame 6 would be identified by the last name in this particular assigned range (which is the base World Wide Name plus 71). Therefore, each potential library drive position is assigned a unique World Wide Name. If a drive is replaced, the new drive will take on the World Wide Name of the replaced drive because the World Wide Name assignment came from the library.

Each drive would be assigned a World Wide Name at drive manufacturing time. Each library would be assigned a range of World Wide Names (one for each potential drive position) at manufacturing time. When a drive is actually installed in a library, the library will instruct the drive to change its World Wide Name through a standard drive/library communications port.

Preferably, according to the first embodiment, a base World Wide Name (WWN) is implemented to indicate to the library where the WWN numbering begins. The base WWN is stored in nonvolatile memory somewhere in the library (PROM, battery backup RAM, hard disk, code image, etc.). The Base Name would normally be set by manufacturing, but alternatively, may be set by an operator or installation technician through an operator panel or some other library interface, or, by unique firmware update images, service tools, etc. The WWN for each device in the library may be calculated by implementing equation 1) as follows:

$$WWN = Base\_WWN + ((Device\_Frame\_Number - 1) * Devices\_Per\_Frame) + Device\_Row\_Number \qquad 1)$$

where: WWN is the World Wide Name for a particular device in the library; Base_WWN is the first WWN for the library (all library WWN's are contiguous); Device_

Frame_Number is the frame number of the device to assign a unique WWN (beginning with frame number 1, for example); Devices_Per_Frame is the number of possible WWN unique devices in each frame; and, Device_Row_Number is the row number of the device to assign a unique WWN (beginning with row number 0, for example).

Another aspect of the present invention addresses the problem of updating libraries of storage automation products that may be already operable in the field. In this embodiment, the library serial number is implemented to calculate the WWN's for each device in the library. This is especially useful to enable products in the field to be upgraded, e.g., to Fibre Channel with minimum intervention from an operator or repair person. The base WWN is part of the library firmware upgrade that enables Fibre Channel communication on a product and a unique serial number associated with the library is used to create the uniqueness required for WWN's. The WWN for each device in the library may be calculated by implementing equation 2) as follows:

$$WWN=Base\_WWN+((Library\_SN-First\_Shipped\_SN)*XXX)+((Device\_Frame\_Number-1)*Devices\_Per\_Frame)+Device\_Row\_Number \quad 2)$$

where: WWN is the World Wide Name for a particular device in the library; Base_WWN is the first WWN for the first library ever shipped; Library_SN is the serial number for the current library; First_Shipped_SN is the serial number of the first library ever shipped; Device_Frame_Number is the frame number of the device to assign a unique WWN (beginning with frame number 1, for example); Devices_Per_Frame is the number of possible WWN unique devices in each frame; Device_Row_Number is the row number of a device to be assigned a unique WWN (beginning with row number 0, for example); and, XXX represents the maximum number of devices to be supported in the library, e.g., 200.

It should be understood that if library serial numbers are not contiguous then a look-up table may be used in place of "Library_SN-First_Shipped_SN" in equation 2).

Thus according to the second embodiment, assuming allocation of a block of 10,000 World Wide Names and each library requires XXX (e.g., 200 for purposes of discussion). The allocated block of World Wide Names begins with 879003000000000 and ends with 879003000009999. If the library serial numbers begin with 3100001, then the library with this serial number would own the World Wide Names from 879003000000000 to 879003000000199. The second library (3100002) would own 879003000000200 to 879003000000399, etc. The invention according to the second embodiment thus implements a firmware-based algorithm that would allow automatic assignment and setup of World Wide Names for any library that may be updated in the field at some future date. A look-up table may be used to cover gaps in serial numbers or gaps in WWN allocations. In this case, there may be ranges of WWN's and/or ranges of serial numbers.

In a further embodiment, groups of Fibre Channel devices may have a base name assigned to them, or individual devices may each have a base name assigned. In this embodiment, Fibre Channel device support may be added incrementally, e.g., one or more devices at a time. The base names may be stored in NVRAM in tables, arrays, lists, or structures, as is known to those skilled in the art.

It should be understood that World Wide Name assignment and management of other devices may be handled in a similar manner as described herein with respect to drives.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A method for assigning unique names to devices provided in an automated library storage product comprising the steps of:
   a) allocating a range of names (N) to said library storage product, a name being assigned in one-to-one correspondence with a device position in said library and, said range including a base name (Base_N) for indicating where library device naming begins;
   b) storing said base name in a memory associated with said library;
   c) installing a device at a position in said library; and
   d) automatically calculating a unique name N based on said stored base name and said device position of said installed device and assigning said calculated name to said installed device.

2. The method for assigning unique names to devices according to claim 1, further including the step of replacing a device in said library with a new device, said method further including the step of assigning to said new device the unique name associated with the device position of said replaced device.

3. The method for assigning unique names to devices according to claim 1, wherein said assignment of said name in step d) includes enabling said automated storage library product to communicate an instruction to said device to change said device name.

4. The method for assigning unique names to devices according to claim 1, wherein said library includes a plurality of frames, each frame organized as a plurality of devices for association with unique names, said devices having a device position corresponding to a row in said frame, wherein said calculating step d) includes the step of calculating an equation:

$$N=Base\_N+((Device\_Frame\_Number-1)*Devices\_Per\_Frame)+Device\_Row\_Number$$

where, N is the unique name for a particular device in the library; Base_N is the first N for said library; Device_Frame_Number is the frame number of the device to assign a unique N; Devices_Per_Frame is the number of possible N unique devices in each frame; and, Device_Row_Number is the row number of device to assign a unique N.

5. The method for assigning unique names to devices according to claim 1, wherein one or more devices of said automated storage library product includes a Fibre Channel communications interface component.

6. The method for assigning unique names to devices according to claim 5, wherein each Fibre Channel communications interface component includes a unique name.

7. The method for assigning unique names to devices according to claim 6, wherein each unique name includes a World Wide Name.

8. The method for assigning unique names to devices according to claim 1, wherein said automated storage library product includes an allocation of unique names to satisfy a maximum allowed configuration of said library product.

9. The method for assigning unique names to devices according to claim 1, wherein said device comprises a data storage device including a disk drive.

10. The method for assigning unique names to devices according to claim 1, wherein said device comprises a data storage device including a tape drive.

11. The method for assigning unique names to devices according to claim 1, wherein said base name is associated with said library.

12. The method for assigning unique names to devices according to claim 1, wherein said base name is associated with a subset of devices in said library.

13. The method for assigning unique names to devices according to claim 1, wherein a different base name is associated with each device position in said library.

14. A method for assigning unique names to devices provided in an automated library storage product, the library storage product having one or more serial number identifiers (SN), said method comprising the steps of:
   a) allocating a block of names (N) for a plurality of library storage products, each library storage product including a plurality of devices in a plurality of device positions;
   b) associating a subset of names (N) of said allocated block with one or more identified serial numbers; and,
   c) provisioning an automated library storage product, said provisioning including automatically calculating a unique name N based on said identified serial number of said storage product and said device position, and assigning said calculated name to a provisioned device.

15. The method for assigning unique names to devices according to claim 14, wherein a first subset of names corresponding to a first serial number associated with an automated library storage product includes a base name (Base_N), said method further including the step of storing said base name in a memory associated with each said library storage product to be provisioned.

16. The method for assigning unique names to devices according to claim 14, wherein a library product includes a plurality of frames, each frame organized as a plurality of devices for association with unique names, each said device having a device position corresponding to a row in said frame, wherein said provisioning step c) includes the step of calculating an equation:

$$N=\text{Base\_}N+((\text{Library\_}SN-\text{First\_Shipped\_}SN)*XXX)+((\text{Device\_Frame\_Number}-1)*\text{Devices\_Per\_Frame})+\text{Device\_Row\_Number}$$

where:
   N is the Name for a particular device in said library to be provisioned; Base_N is the first N for the first library ever shipped; Library_SN is the serial number for said library being provisioned; First_Shipped_SN is the serial number of the first library ever shipped; Device_Frame_Number is the frame number of a device to assign a unique N; Devices_Per_Frame is the number of possible N unique devices in each frame; Device_Row_Number is the row number of a device to be assigned a unique N; and, XXX represents the maximum number of devices to be supported in the library.

17. The method for assigning unique names to devices according to claim 14, wherein said automated storage library product is provisioned to interface with a Fibre Channel communications interface component, one or more devices included therein being provisioned to interface with said Fibre Channel interface component.

18. The method for assigning unique names to devices according to claim 17, wherein each Fibre Channel communications interface component includes a unique name.

19. The method for assigning unique names to devices according to claim 18, wherein each unique name includes a World Wide Name.

20. The method for assigning unique names to devices according to claim 14, wherein said device comprises a data storage device including a disk drive.

21. The method for assigning unique names to devices according to claim 14, wherein said device comprises a data storage device including a tape drive.

22. A program storage device readable by a machine, tangibly embodying a program of instructions executable by the machine to perform method steps for assigning unique names to devices provided in an automated library storage product, said method steps comprising:
   a) allocating a range of names (N) to said library storage product, a name being assigned in one-to-one correspondence with a device position in said library and, said range including a base name (Base_N) for indicating where library device naming begins;
   b) storing said base name in a memory associated with said library;
   c) installing a device at a position in said library; and
   d) automatically calculating a unique name N based on said stored base name and said device position of said installed device and assigning said calculated name to said installed device.

23. The program storage device readable by a machine as claimed in claim 22, wherein said method steps further include the step of replacing a device in said library with a new device, said method further including the step of assigning to said new device the unique name associated with the device position of said replaced device.

24. The program storage device readable by a machine as claimed in claim 22, wherein said assignment of said name in step d) includes enabling said automated storage library product to communicate an instruction to said device to change said device name.

25. The program storage device readable by a machine as claimed in claim 22, wherein said library includes a plurality of frames, each frame organized as a plurality of devices for association with unique names, said devices having a device position corresponding to a row in said frame, wherein said calculating step d) includes the step of calculating an equation:

$$N=\text{Base\_}N+((\text{Device\_Frame\_Number}-1)*\text{Devices\_Per\_Frame})+\text{Device\_Row\_Number}$$

where, N is the unique name for a particular device in the library; Base_N is the first N for said library; Device_Frame_Number is the frame number of the device to assign a unique N; Devices_Per_Frame is the number of possible N unique devices in each frame; and, Device_Row_Number is the row number of device to assign a unique N.

26. The program storage device readable by a machine as claimed in claim 22, wherein said device comprises a data storage device including a disk drive.

27. The program storage device readable by a machine as claimed in claim 22, wherein said device comprises a data storage device including a tape drive.

28. The method for assigning unique names to devices according to claim 22, wherein said base name is associated with said library.

29. The method for assigning unique names to devices according to claim 22, wherein said base name is associated with a subset of devices in said library.

30. The method for assigning unique names to devices according to claim 22, wherein a different base name is associated with each device position in said library.

31. A program storage device readable by a machine, tangibly embodying a program of instructions executable by the machine to perform method steps for assigning unique names to devices provided in an automated library storage product, a library storage product having one or more serial number identifiers (SN), said method steps comprising:

a) allocating a block of names (N) for a plurality of library storage products, each library storage product including a plurality of devices in a plurality of device positions;

b) associating a subset of names (N) of said allocated block with one or more identified serial numbers; and, c) provisioning an automated library storage product, said provisioning including automatically calculating a unique name based on said identified serial number of said storage product and said device position, and assigning said calculated name to a provisioned device.

32. The program storage device readable by a machine as claimed in claim 31, wherein a first subset of names corresponding to a first serial number associated with an automated library storage product includes a base name (Base_N), said method further including the step of storing said base name in a memory associated with each said library storage product to be provisioned.

33. The program storage device readable by a machine as claimed in claim 31, wherein a library product includes a plurality of frames, each frame organized as a plurality of devices for association with unique names, each said device having a device position corresponding to a row in said frame, wherein said provisioning step c) includes the step of calculating an equation:

$$N=Base\_N+((Library\_SN-First\_Shipped\_SN)*XXX)+((Device\_Frame\_Number-1)*Devices\_Per\_Frame)+Device\_Row\_Number$$

where:

N is the Name for a particular device in said library to be provisioned; Base_N is the first N for the first library ever shipped; Library_SN is the serial number for said library being provisioned; First_Shipped_SN is the serial number of the first library ever shipped; Device_Frame_Number is the frame number of a device to assign a unique N; Devices_Per_Frame is the number of possible N unique devices in each frame; Device_Row_Number is the row number of a device to be assigned a unique N; and, XXX represents the maximum number of devices to be supported in the library.

34. The program storage device readable by a machine as claimed in claim 31, wherein said device comprises a data storage device including a disk drive.

35. The program storage device readable by a machine as claimed in claim 31, wherein said device comprises a data storage device including a tape drive.

36. An automated library storage product including a plurality of data storage drives each in a plurality of drive positions, each drive accessible to read and write data thereto, said automated library storage product having one or more machine readable library serial number identifiers (SN), said automated library storage product comprising:

means for identifying a position for a drive in said library;

memory storage device for storing information received;

an interface device for receiving information capable of generating one or more unique names to be associated with data storage drives of said library storage product; and, control means for calculating a unique name N based on said identified serial number of said storage product, said data storage drive position of a drive to be provisioned, and received information, and assigning said calculated name to a provisioned drive.

37. The automated library storage product as claimed in claim 36, further including a mechanism for allocating a block of names (N) for a plurality of automated library storage products, each library storage product including a plurality of data storage drives in a plurality of drive positions, said mechanism further associating a subset of names (N) of said allocated block with each machine readable library serial number identifier (SN).

38. The automated library storage product as claimed in claim 37, wherein a first subset of names corresponding to a first serial number associated with a first automated library storage product includes a base name (Base_N), said received information including said base name (Base_N) for storage in said memory storage device.

39. The automated library storage product as claimed in claim 36, wherein a library includes a plurality of frames, each frame organized as a plurality of data storage devices for association with unique names, each said device having a drive position corresponding to a row in said frame, wherein said control means calculates a name N according to an equation:

$$N=Base\_N+((Library\_SN-First\_Shipped\_SN)*XXX)+((Device\_Frame\_Number-1)*Devices\_Per\_Frame)+Device\_Row\_Number$$

where:

N is the Name for a particular device in said library to be provisioned; Base_N is the first N for said first library; Library_SN is the serial number for said library being provisioned; First_Shipped_SN is the serial number of the first library; Device_Frame_Number is the frame number of a device to assign a unique N; Devices_Per_Frame is the number of possible N unique devices in each frame; Device_Row_Number is the row number of a device to be assigned a unique N; and, XXX represents the maximum number of devices to be supported in the library.

40. The automated library storage product according to claim 39, wherein said interface device for receiving information includes a Fibre Channel communications interface component, one or more of said data storage devices capable of interfacing with said Fibre Channel interface component.

41. The method for assigning unique names to devices according to claim 36, wherein said base name is associated with said library.

42. The method for assigning unique names to devices according to claim 36, wherein said base name is associated with a subset of devices in said library.

43. The method for assigning unique names to devices according to claim 36, wherein a different base name is associated with each device position in said library.

44. A method for assigning unique names to devices provided in a data storage system comprising the steps of:

a) allocating a range of names (N) to said storage system, a name being assigned in one-to-one correspondence with a device position in said storage system and, said range including a base name (Base_N) for indicating where device naming begins;

b) storing said base name in a memory associated with said storage system;

c) installing a device at a position in said storage system; and d) automatically calculating a unique name N based on said stored base name and said device position of said installed device and assigning said calculated name to said installed device.

45. The method for assigning unique names to devices according to claim 44, further including the step of replacing a device in said storage system with a new device, said method further including the step of assigning to said new device the unique name associated with the device position of said replaced device.

46. The method for assigning unique names to devices according to claim 44, wherein said assignment of said name in step d) includes enabling said storage system to communicate an instruction to said device to change said device name.

47. The method for assigning unique names to devices according to claim 44, wherein said storage system includes a plurality of frames, each frame organized as a plurality of devices for association with unique names, said devices having a device position corresponding to a row in said frame, wherein said calculating step d) includes the step of calculating an equation:

$$N=\text{Base\_}N+((\text{Device\_Frame\_Number}-1)*\text{Devices\_Per\_Frame})+\text{Device\_Row\_Number}$$

where, N is the unique name for a particular device in the storage system; Base_N is the first N for said storage system; Device_Frame_Number is the frame number of the device to assign a unique N; Devices_Per_Frame is the number of possible N unique devices in each frame; and, Device_Row_Number is the row number of a device to assign a unique N.

48. The method for assigning unique names to devices according to claim 44, wherein one or more devices of said storage system includes a Fibre Channel communications interface component.

49. The method for assigning unique names to devices according to claim 48, wherein each Fibre Channel communications interface component includes a unique name.

50. The method for assigning unique names to devices according to claim 49, wherein each unique name includes a World Wide Name.

51. The method for assigning unique names to devices according to claim 44, wherein said storage system includes an allocation of unique names to satisfy a maximum allowed configuration of said storage system.

52. The method for assigning unique names to devices according to claim 44, wherein said device comprises a data storage media removable from said system.

53. The method for assigning unique names to devices according to claim 44, wherein said device comprises a data storage media at a fixed location in said storage system.

54. A method for assigning unique names to devices in a data storage system, the storage system having one or more serial number identifiers (SN), said method comprising the steps of:
   a) allocating a block of names (N) for a plurality of data storage systems, each storage system including a plurality of devices in a plurality of device positions;
   b) associating a subset of names (N) of said allocated block with one or more identified serial numbers; and,
   c) provisioning a storage system, said provisioning including automatically calculating a unique name N based on said identified serial number of said storage system and said device position, and assigning said calculated name to a provisioned device.

55. The method for assigning unique names to devices according to claim 54, wherein a first subset of names corresponding to a first serial number associated with a storage system includes a base name (Base_N), said method further including the step of storing said base name in a memory associated with each said storage system to be provisioned.

56. The method for assigning unique names to devices according to claim 54, wherein a storage system includes a plurality of frames, each frame organized as a plurality of devices for association with unique names, each said device having a device position corresponding to a row in said frame, wherein said provisioning step c) includes the step of calculating an equation:

$$N=\text{Base\_}N+((\text{Library\_}SN-\text{First\_Shipped\_}SN)*XXX)+((\text{Device\_Frame\_Number}-1)*\text{Devices\_Per\_Frame})+\text{Device\_Row\_Number}$$

where:
   N is the Name for a particular device in said storage system to be provisioned; Base_N is the first N for the first storage system ever shipped; Library_SN is the serial number for said storage system being provisioned; First_Shipped_SN is the serial number of the first storage system ever shipped; Device_Frame_Number is the frame number of a device to assign a unique N; Devices_Per_Frame is the number of possible N unique devices in each frame; Device_Row_Number is the row number of a device to be assigned a unique N; and, XXX represents the maximum number of devices to be supported in the storage system.

57. The method for assigning unique names to devices according to claim 54, wherein one or more devices of said storage system includes a Fibre Channel communications interface component.

58. The method for assigning unique names to devices according to claim 57, wherein each Fibre Channel communications interface component includes a unique name.

59. The method for assigning unique names to devices according to claim 58, wherein each unique name includes a World Wide Name.

60. The method for assigning unique names to devices according to claim 54, wherein said device comprises a data storage media removable from said storage system.

61. The method for assigning unique names to devices according to claim 54, wherein said device comprises a data storage media at a fixed location in said storage system.

* * * * *